Patented Mar. 10, 1953

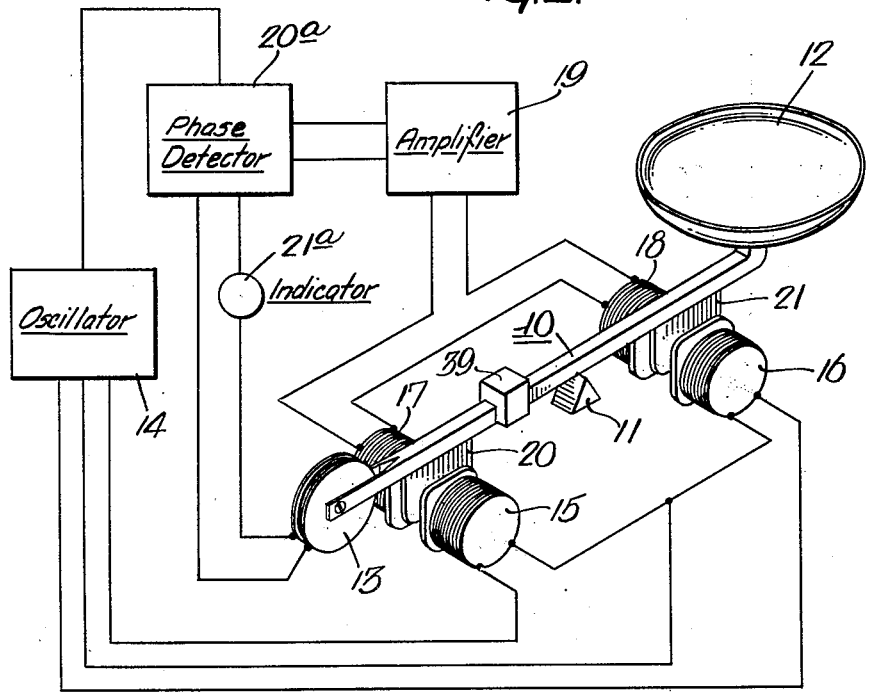
Fig. 1.
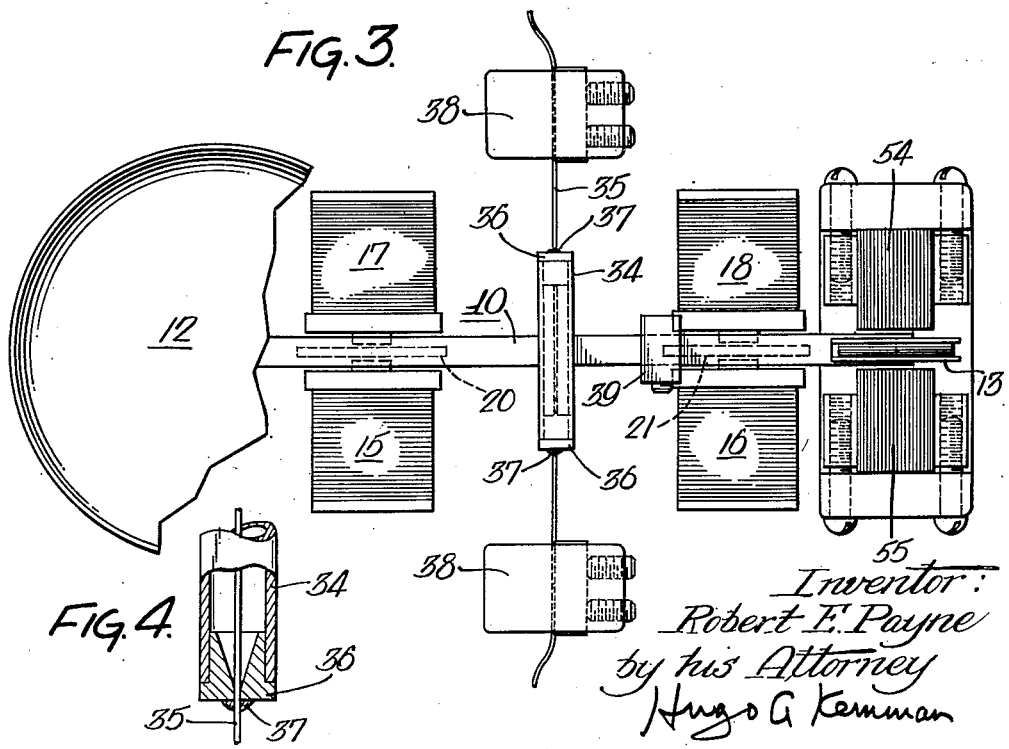
Fig. 3.
Fig. 4.
Inventor:
Robert E. Payne
by his Attorney
Hugo G. Kenman March 10, 1953 R. E. PAYNE 2,631,027
FORCE MEASURING APPARATUS
Filed Aug. 28, 1948 3 Sheets-Sheet 2
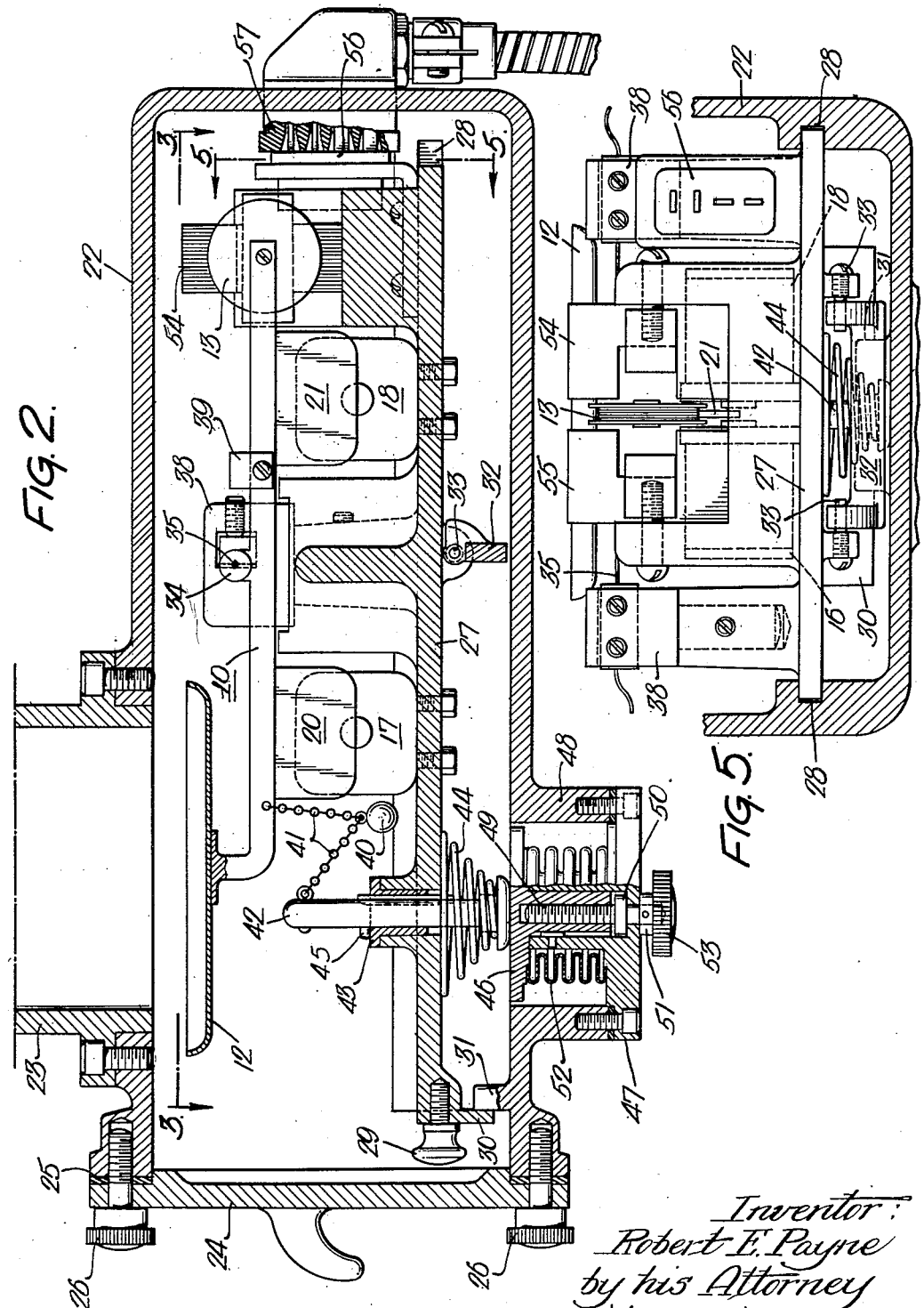
Inventor:
Robert E. Payne
by his Attorney
Hugo A. Kenman

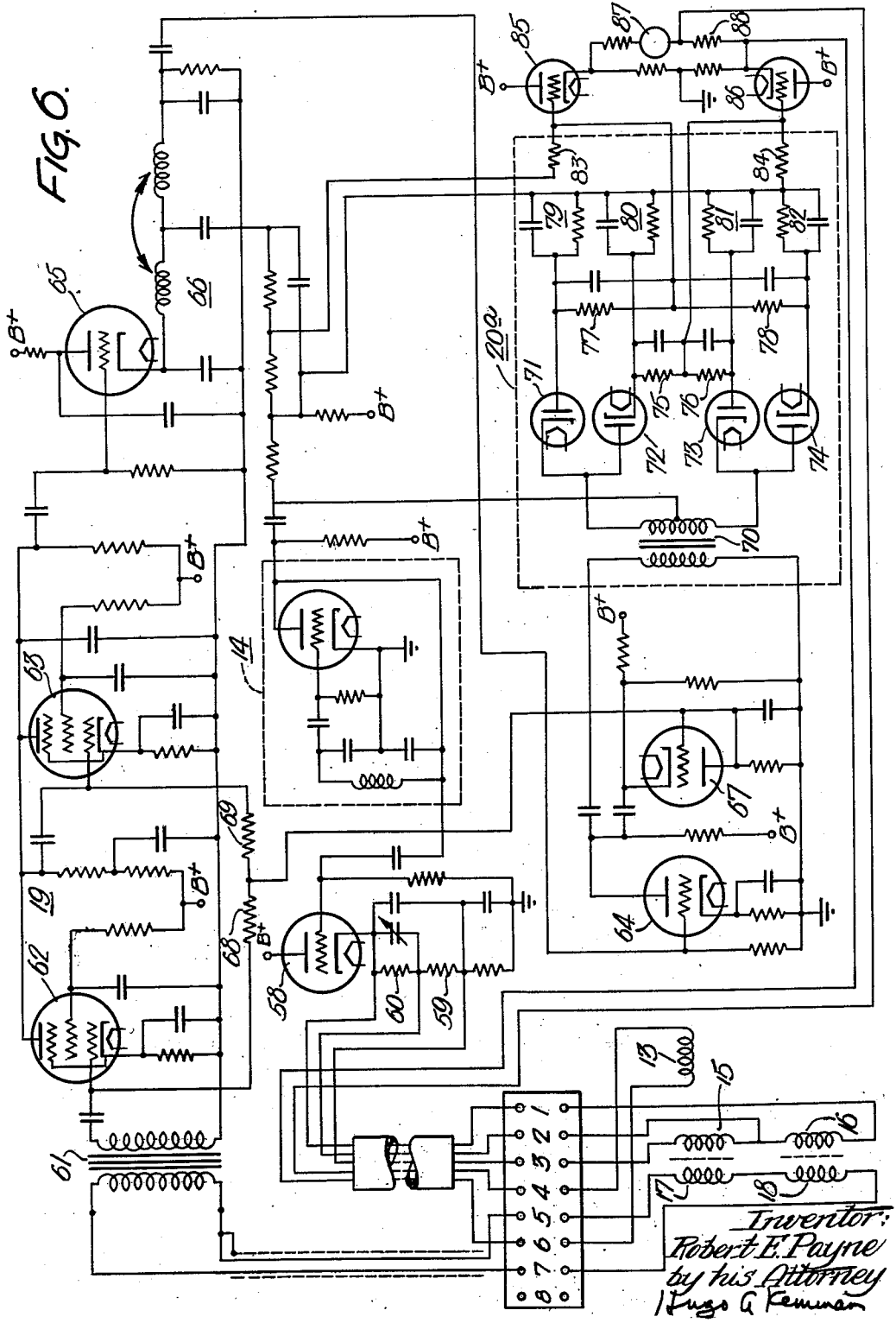

2,631,027

UNITED STATES PATENT OFFICE 2,631,027

FORCE MEASURING APPARATUS

Robert E. Payne, Upper Darby, Pa., assignor to The Sharples Corporation, a corporation of Delaware Application August 28, 1948, Serial No. 46,642

15 Claims. (Cl. 265—70)

This invention broadly relates to systems for measuring varying forces, especially where minute forces are involved and great sensitivity and accuracy are required. More particularly, the invention relates to a novel apparatus for analyzing powdered or finely divided material by determining its particle size distribution. The present invention is in the nature of an improvement in the apparatus disclosed and claimed in my copending application Serial No. 768,907, filed August 15, 1947, now Patent No. 2,597,899.

The said copending application discloses an apparatus for determining particle size distribution, according to Stoke's law, by observing the rate of fall, and the percentage amount of particles having that rate of fall, of finely divided material freely dispersed in a gaseous medium and falling gravitationally therein. The said apparatus comprises a vertical sedimentation tower containing the gaseous medium and through which the finely divided material is permitted to fall, and an associated weighing system including electrical means for maintaining an equilibrium condition and for indicating the weight of the accumulating particles in terms of readings from which particle diameters can readily be determined.

In the said apparatus of the above mentioned copending application, the weighing system employs photoelectric means for detecting unbalance or deviation from the equilibrium condition. Such a system is not as sensitive and does not have as rapid a response as desired in an apparatus of the character above mentioned wherein very minute force increments are involved and an extremely high degree of sensitivity and speed of response is very desirable. Moreover, a photoelectric system is difficult to maintain in a fine condition of adjustment and is prone to get out of adjustment. Due to the delicacy of such a system, any slight jarring of the apparatus may cause sufficient displacement of the elements to throw the system out of adjustment.

The present invention has for its main object the provision of an improved and highly satisfactory weighing system in an apparatus of the character above mentioned. By this invention, there is provided a novel weighing system comprising a torsional balance and an associated electronic servo-mechanism which utilizes amplitude and phase modulation of a carrier wave and detection of the modulation components, as hereinafter more fully described. The system provided by this invention is highly sensitive to minute force increments, and is rugged and not susceptible to easy misadjustment.

A further feature of the present invention is the provision of a novel arrangement by which successive tests or "runs" may be made without removing the finely divided material from the weighing balance pan after each test.

Other features of the invention will be apparent from the following detailed description of the preferred embodiment shown in the drawings, wherein:

Fig. 1 is a generalized diagrammatic illustration of the weighing system provided by the invention;

Fig. 2 is a longitudinal sectional view of a preferred embodiment of the apparatus;

Fig. 3 is a plan view of the weighing mechanism taken along line 3—3 of Fig. 2;

Fig. 4 is a detail sectional view showing the manner of attachment of the balance arm assembly to the torsion wire;

Fig. 5 is a sectional view taken along line 5—5 of Fig. 2; and

Fig. 6 is a diagrammatic illustration of the electrical system.

In order to facilitate a full understanding of the invention, it is deemed desirable first to consider generally the novel weighing system as shown in Fig. 1. A balance member 10 is shown supported on a fulcrum 11 and carrying a pan 12 on one side of the fulcrum to receive material deposited thereon. On the opposite side of the fulcrum, a restoring coil 13 is provided on the balance member 10, said coil forming part of means to restore the balance arm to its equilibrium position, as more fully described hereinafter. An oscillator 14 supplies a carrier wave to two stationary coils 15 and 16 which are disposed respectively on the opposite sides of the fulcrum 11 in cooperative association with the balance arm 10. Two other stationary coils 17 and 18 are inductively associated with the coils 15 and 16, respectively, and are connected in series opposition to one another to the input of an amplifier 19. Metal vanes 20 and 21, preferably of aluminum, are carried by the balance arm 10 and are arranged respectively between coils 15 and 17 and between coils 16 and 18. Normally the arm 10 is in balanced or equilibrium position, and the voltages induced in coils 17 and 18 are equal and cancel one another, so that no resultant voltage appears across said coils. Any unbalance of the arm 10, however, causes a resultant voltage to appear across said coils. The instantaneous magnitude and phase of this voltage are dependent upon the position of vanes 20 and 21, since the vanes vary the coupling between the coils and the eddy currents produced in the vanes vary the phase relation of the coupled voltages. The amplitude of the resultant voltage is dependent upon the magnitude of deflection of arm 10, while the phase of said voltage is dependent upon the direction or sense of such deflection. Thus the carrier wave supplied from oscillator 14 is amplitude- and phase-modulated according to the magnitude and sense of deflection of balance arm 10, the modulated carried wave appearing across coils 17 and 18 and being supplied to the amplifier 19. The modulated voltage will be referred to as the error signal. A phase sensitive detector 20a serves to detect the modulation components of the error signal and produces an output voltage whose instantaneous amplitude is dependent on the magnitude of deflection of arm 10 and whose polarity is dependent on the sense of the deflection. This voltage activates the restoring coil 13 to restore the equilibrium position of the balance arm 10. The indicating means, represented at 21a, serves to indicate the magnitude and sense of deflection of the arm 10.

Referring now to Fig. 2, there is shown a casing or housing 22 secured to the lower end of a sedimentation tower 23 of the character disclosed in the aforementioned copending application. The weighing scale mechanism is removably disposed in said casing, being insertable and removable through a door 24 at one end of the casing. When the door is closed, an air tight seal is created by a gasket 25 and screws 26. A plate 27 serves to support the various elements of the scale mechanism, and this plate is slidable in grooves 28 (see Fig. 5) in the side walls of casing 22. The plate is movable by means of a knob 29, its inward movement being limited by stops 30 and 31 on the plate and the casing. A stop 32, pivotally carried by pins 33, limits outward movement of plate 27, but the plate may be removed entirely by moving its outward and lifting stop 32 so it will clear stop 31.

The balance arm 10 is carried by a tubular support 34 and an associated torsion wire 35. The support 34 is provided with end plugs 36, and the wire extends through said plugs and through the support, as shown in Fig. 4. Each end plug is soldered to the wire at 37. The outer ends of the wire are secured to supporting posts 38 mounted on the plate 27. The wire is clamped under a tension of approximately thirty pounds at the two supporting posts.

The coils 15 to 18 are mounted on the supporting plate 27 in association with the vanes 20 and 21 carried by the balance arm. Preferably, the balance arm 10, its support 34 and the vanes 20 and 21 are welded into an integral unitary structure.

On one side of the fulcrum constituted by the torsion wire support, the balance arm 10 carries a counter-weight 39, and on the other side of the fulcrum there is provided a balance adjusting arrangement. The latter comprises a weight 40 supported by a flexible element 41, such as a chain, which has its ends secured respectively to the balance arm 10 and to a vertically movable follower 42. The latter is slidably keyed to a bushing 43 and is urged downwardly by a spring 44. A stop pin 45 on the movable follower 42 serves to limit the downward movement thereof. When the weighing mechanism is removed from the casing as above described, the follower 42 may be raised so that it will clear stop 31. The follower 42 is engaged by an adjustable member 46 which is slidably keyed to a stationary member 47 carried by a cylindrical extension 48 of the casing. A screw 49 is rotatably supported by member 47 and threadedly engages member 46. Collars 50 and 51 on said screw prevent longitudinal movement thereof. A bellows 52 is secured to members 46 and 47 and prevents passage of air into the casing 22.

The purpose of an arrangement just described is to enable the making of a number of successive tests or runs without opening the balance housing and removing the finely divided material from the pan 12. With the follower 42 substantially in its lowermost position, as shown, the effectiveness of weight 40 on the balance arm 10 is a maximum. By moving the follower upward, by turning knob 53, the effective weight on the pan 12 is decreased. Thus, after a test or run has been made, the screw 49 may be adjusted to decrease the effective weight on the pan, permitting the indicating meter to return to zero position. The restoring coil 13 cooperates with a pair of horse-shoe type permanent magnets 54 and 55 oppositely arranged with space therebetween sufficient to accommodate the coil 13 which is disposed between the opposite-polarity opposing pole faces of the two permanent magnets. The arrangement is such that a direct current of one polarity in coil 13 will cause the coil to move upward, while a direct current of opposite polarity will cause the coil to move downward.

The coils 13 and 15 to 18 are connected to the external circuit elements through plug and socket members 56 and 57 carried by plate 27 and casing 22, respectively. The connections are automatically made when plate 27 is fully inserted in the casing. Of course, fine wires should be used to connect coil 13 to the plug 56.

The complete electrical system is shown in Fig. 6. The oscillator 14 may be of any suitable type and is here shown as a Colpitts oscillator which is well known and does not require detailed description. The oscillator may operate at any suitable frequency, for example at 8 kc. The output of the oscillator is supplied to a cathode-loaded tube 58 which serves as a buffer to eliminate undesirable harmonics. Coils 15 and 16 are connected across resistors 59 and 60 which supply equal voltages to the said coils. As previously mentioned, coils 17 and 18 are connected in series opposition, and the voltages induced in these coils oppose one another. These coils are connected to the amplifier 19 which is a conventional high gain resistance-coupled amplifier including the input transformer 61 and vacuum tubes 62, 63 and 64. Interposed between the tubes 63 and 64 is a conventional cathode follower tube 65 and a low-pass filter 66. The cathode follower stage serves to match the circuit impedance of tube 63 with that of the low-pass filter 66. The latter serves to remove undesirable harmonic frequencies which might be present and which might otherwise overload the last amplifier stage and interfere with the proper operation of the phase sensitive detector.

Preferably, the amplifier is provided with a conventional delayed automatic volume control (A. V. C.) arrangement comprising a biased diode 67 connected to the output of tube 64 and adapted to supply a bias voltage to the control grids of tubes 62 and 63 through resistors 68 and 69 whenever the output of tube 64 exceeds the normal bias of the diode. Normally, the diode is non-conductive, and the A. V. C. circuit is inoperative, and this condition obtains during normal deflection of the balance arm. However, in the event of excessive deflection of the balance arm, the A. V. C. circuit goes into operation to limit the maximum output voltage. The purpose of this is to eliminate undesired distortion which might be caused by overloading one of the amplifier stages, and also to prevent application of an excessive voltage to the indicating meter.

The amplified error signal is supplied to the balanced phase sensitive detector 20 through transformer 70, and the switching voltage from the oscillator 14 is also supplied to the phase sensitive detector through the center tap on the secondary of said transformer. The phase sensitive detector comprises diodes 71 to 74 and the associated resistance-capacitance combinations 75 to 82 connected as shown. This circuit transforms the amplified modulated error signal into a low frequency voltage whose instantaneous magnitude depends upon the instantaneous deflection of the balance arm, and whose polarity depends on the sense of the deflection. Since the low frequency voltage depends both upon the magnitude of the amplified error signal (the magnitude of the switching voltage is greater than this) and on the cosine of the phase difference between the amplified error signal and the switching signal, the over-all sensitivity of the pickup-detector system depends upon both the amplitude and phase changes which occur in the error signal when the balance arm is deflected.

The R-C circuits 75 and 76 and resistors 83 and 84 form a phase shifting network which insures that the low frequency voltage from the detector has the correct instantaneous polarity such that if it were applied to the restoring coil 13 the restoring torque would be applied with practically no time delay relative to the original force applied to the balance pan. This circuit stabilizes the servo-mechanical system and prevents it from being an oscillating system for the high amplifier gain required for fast response characteristics.

Tubes 85 and 86 form a cathode follower stage to provide sufficient power at the output of the detector. The output current is supplied to a micro-ammeter 87 which is calibrated in units of deflection. A fraction of the meter current is supplied to the restoring coil from resistor 88.

Considering the operation of the apparatus as a whole, in making a test or run the finely divided material to be tested is caused to fall in the sedimentation tower 23 onto the balance pan 12 and meter readings are recorded at convenient intervals. The corresponding times are also recorded. As the falling material begins to accumulate on the pan 12, the equilibrium position of the balance arm 10 is imperceptibly disturbed. The slight deflection of the arm causes the electrical system to operate as above described, and a restoring force is applied to the balance arm by the coil 13. As more material particles accumulate on the plan the restoring torque is increased accordingly. The meter reading is recorded periodically as is also the time. The heavier particles will reach the pan first, followed by particles of successively smaller diameters. The recorded data enables the desired analysis with respect to particle size distribution, as described in the aforementioned application.

At the end of a run, the balance adjustment screw 53 may be adjusted as previously mentioned to enable the making of a succeeding run without removing the material deposited on the balance pan during the first run. Several successive runs may be made in this manner.

The apparatus provided by this invention greatly extends the possible range of particle size analysis. It is, of course, apparent that considerable modification may be made in the apparatus without departing from the invention.

I claim:

1. In a force measuring system, a fulcrumed balance member adapted to have a force applied thereto at one side of the fulcrum point, means for producing an electrical wave of certain frequency, a pair of transformers connected to said first means and disposed respectively at opposite sides of said fulcrum point in cooperative association with said member, means on said member for differentially varying the inductive couplings of said transformers in response to movement of said member so as to effect amplitude and phase modulation of said wave according to the instantaneous magnitude and sense of deflection of said member by a force applied thereto, means responsive to the modulated wave for producing a voltage whose instantaneous amplitude is dependent on the magnitude of said deflection and whose polarity is dependent on the sense of said deflection, means responsive to said voltage for applying a restoring force to said member at the side of its fulcrum point opposite the side at which the first-mentioned force is applied, and electrically operable means for indicating the instantaneous magnitude and sense of the restoring force.

2. In a force measuring system, a fulcrumed balance member adapted to have a force applied thereto at one side of the fulcrum point, means for producing an electrical wave of certain frequency, a pair of stationary coils disposed respectively at opposite sides of said fulcrum point in proximity to said member, means for applying said wave to said coils, a second pair of stationary coils connected in series opposition with each other and inductively associated respectively with said first-mentioned coils, means on said member for varying the inductive coupling between the associated coils and the phase relation of the coil voltages as said member is deflected by a force applied thereto, whereby said wave appears across said second pair of coils amplitude and phase modulated according to the instantaneous magnitude and sense of deflection of said member, means for amplifying the modulated wave, means responsive to the amplified modulated wave for producing a voltage whose instantaneous amplitude is dependent on the magnitude of said deflection and whose polarity is dependent on the sense of said deflection, means responsive to said voltage for applying a restoring force to said member at the side of its fulcrum point opposite the side at which the first-mentioned force is applied, and electrically operable means for indicating the instantaneous magnitude and sense of the restoring force.

3. In a force measuring system, a fulcrumed balance member adapted to have a force applied thereto at one side of the fulcrum point, means for producing an electrical wave of certain frequency, a pair of stationary coils disposed respectively at opposite sides of said fulcrum point in proximity to said member, means for applying said wave to said coils, a second pair of stationary coils connected in series opposition with each other and inductively associated respectively with said first-mentioned coils, a pair of metal vanes on said member arranged to vary the inductive coupling between the associated coils and the phase relation of the coil voltages as said member is deflected by a force applied thereto, whereby said wave appears across said second pair of coils amplitude and phase modulated according to the instantaneous magnitude and sense of deflection of said member, means for amplifying the modulated wave, means responsive to the amplified modulated wave for producing a voltage those instantaneous amplitude is dependent on the magnitude of said deflection and whose polarity is dependent on the sense of said deflection, means responsive to said voltage for applying a restoring force to said member at the side of its fulcrum point opposite the side at which the first-mentioned force is applied, and electrically operable means for indicating the instantaneous magnitude and sense of the restoring force.

4. In an apparatus for determining particle size distribution of finely divided material, a fulcrumed balance arm having a collecting pan thereon to receive said material, means for producing an electrical wave of certain frequency, a pair of transformers connected to said first means and disposed respectively at opposite sides of the fulcrum of said arm in cooperative association with the arm, means on said arm for differentially varying the inductive couplings of said transformers in response to movement of said arm so as to effect amplitude and phase modulation of said wave according to the instantaneous magnitude and sense of deflection of said arm, means responsive to the modulated wave for producing a voltage whose instantaneous amplitude is dependent on the magnitude of said deflection and whose polarity is dependent on the sense of said deflection, means responsive to said voltage for applying a restoring force to said arm, and electrically operable means for indicating the instantaneous magnitude and sense of the restoring force.

5. In an apparatus for determining particle size distribution of finely divided material, a fulcrumed balance arm having a collecting pan thereon to receive said material, an oscillator for producing an electrical wave of certain frequency, a pair of transformers connected to said first means and disposed respectively at opposite sides of the fulcrum of said arm in cooperative association with the arm, means on said arm for differentially varying the inductive couplings of said transformers in response to movement of said arm so as to effect amplitude and phase modulation of said wave according to the instantaneous magnitude and sense of deflection of said arm, a phase sensitive detector responsive to the modulated wave for producing a voltage whose instantaneous amplitude is dependent on the magnitude of said deflection and whose polarity is dependent on the sense of said deflection, restoring means including a coil on said arm, means responsive to said voltage for energizing said coil to apply a restoring force to said arm, and an electric meter arranged for operation by the current supplied to said coil.

6. In an apparatus for determining particle size distribution of finely divided material, a balance arm having a collecting pan thereon to receive said material, means for producing an electrical wave of certain frequency, means including a torsion wire for supporting said arm, a pair of stationary coils disposed respectively at opposite sides of said wire in proximity to said arm, means for applying said wave to said coils, a second pair of stationary coils connected in series opposition with each other and inductively associated respectively with said first-mentioned coils, means on said arm for varying the inductive coupling between the associated coils and the phase relation of the coil voltages, whereby said wave appears across said second pair of coils amplitude and phase modulated according to the instantaneous magnitude and sense of deflection of said arm, means responsive to the modulated wave for producing a voltage whose instantaneous amplitude is dependent on the magnitude of said deflection and whose polarity is dependent on the sense of said deflection, means responsive to said voltage for applying a restoring force to said arm, and electrically operable means for indicating the instantaneous magnitude and sense of the restoring force.

7. In a force measuring system, a fulcrumed balance member adapted to have a force applied thereto at one side of the fulcrum point, a torsion wire fulcrum mounting for said member, means for producing an electrical wave of certain frequency, a pair of stationary coils disposed respectively at opposite sides of said fulcrum point in proximity to said member, means for applying said wave to said coils, a second pair of stationary coils connected in series opposition with each other and inductively associated respectively with said first-mentioned coils, means on said member for varying the inductive coupling between the associated coils and the phase relation of the coil voltages as said member is deflected by a force applied thereto, whereby said wave appears across said second pair of coils amplitude and phase modulated according to the instantaneous magnitude and sense of deflection of said member, means for amplifying the modulated wave, means responsive to the amplified modulated wave for producing a voltage whose instantaneous amplitude is dependent on the magnitude of said deflection and whose polarity is dependent on the sense of said deflection, means responsive to said voltage for applying a restoring force to said member at the side of its fulcrum point opposite the side at which the first-mentioned force is applied, and electrically operable means for indicating the instantaneous magnitude and sense of the restoring force.

8. In a force measuring system, a fulcrumed balance member adapted to have a force applied thereto at one side of the fulcrum point, means for producing an electrical wave of certain frequency, a pair of stationary coils disposed respectively at opposite sides of said fulcrum point in proximity to said member, means for applying said wave to said coils, a second pair of stationary coils connected in series opposition with each other and inductively associated respectively with said first-mentioned coils, means on said member for varying the inductive coupling between the associated coils and the phase relation of the coil voltages as said member is deflected by a force applied thereto, whereby said wave appears across said second pair of coils amplitude and phase modulated according to the instantaneous magnitude and sense of deflection of said member, means for amplifying the modulated wave, means responsive to the amplified modulated wave for producing a voltage whose instantaneous amplitude is dependent on the magnitude of said deflection and whose polarity is dependent on the sense of said deflection, a restoring coil on said member at the side of its fulcrum point opposite the side at which said force is applied, means associated with said restoring coil for establishing a magnetic field in which the restoring coil is disposed, means for applying said voltage to said restoring coil, whereby a restoring force is applied to said member by interaction of the restoring coil and the associated magnetic field, and electrically operable means for indicating the instantaneous magnitude and sense of the restoring force.

9. In a force measuring system, a fulcrumed balance member adapted to have a force applied thereto at one side of the fulcrum point, means for producing an electrical wave of certain frequency, a pair of stationary coils disposed respectively at opposite sides of said fulcrum point in proximity to said member, means for applying said wave to said coils, a second pair of stationary coils connected in series opposition with each other and inductively associated respectively with said first-mentioned coils, a pair of metal vanes on said member arranged to vary the inductive coupling between the associated coils and the phase relation of the coil voltages as said member is deflected by a force applied thereto, whereby said wave appears across said second pair of coils amplitude and phase modulated according to the instantaneous magnitude and sense of deflection of said member, means for amplifying the modulated wave, means responsive to the amplified modulated wave for producing a voltage whose instantaneous amplitude is dependent on the magnitude of said deflection and whose polarity is dependent on the sense of said deflection, a restoring coil on said member at the side of its fulcrum point opposite the side at which said force is applied, means associated with said restoring coil for establishing a magnetic field in which the restoring coil is disposed, means for applying said voltage to said restoring coil, whereby a restoring force is applied to said member by interaction of the restoring coil and the associated magnetic field, and electrically operable means for indicating the instantaneous magnitude and sense of the restoring force.

10. In a force measuring system, a member ar arranged for rotary movement about an axis and adapted to have a force applied thereto at a point spaced from said axis, a pair of transformers disposed respectively at opposite sides of said axis in cooperative association with said member, each transformer having inductively coupled primary and secondary windings, means for supplying alternating voltage to the primary of each transformer, whereby alternating voltages are caused to appear across the secondary windings, means on said member for differentially varying the inductive couplings of said transformers in response to movement of said member, thereby differentially varying the voltages across said secondary windings, means connecting said secondary windings in series opposition to produce a resultant voltage, means responsive to said resultant voltage for producing a voltage whose instantaneous amplitude and polarity are dependent on the magnitude and sense of movement of said member, means responsive to the latter voltage for applying a restoring force to said member, and electrically-operable means for indicating the instantaneous magnitude and sense of the restoring force.

11. A force measuring system according to claim 10, wherein the means for differentially varying the couplings of said transformers comprises a pair of metal vanes on said member.

12. A force measuring system according to claim 10, comprising means including a torsion wire for supporting said member.

13. In an apparatus for determining particle size distribution of finely divided material, a fulcrumed balance arm having a collecting pan thereon to receive said material, a pair of transformers disposed respectively at opposite sides of the fulcrum of said arm in cooperative association with said arm, each transformer having inductively coupled primary and secondary windings, means for supplying alternating voltage to the primary of each transformer, whereby alternating voltages are caused to appear across the secondary windings, means on said arm for differentially varying the inductive couplings of said transformers in response to movement of said arm, thereby differentially varying the voltages across said secondary windings, means connecting said secondary windings in series opposition to produce a resultant voltage, means responsive to said resultant voltage for producing a voltage whose instantaneous amplitude and polarity are dependent on the magnitude and sense of movement of said arm, means responsive to the latter voltage for applying a restoring force to said arm, and electrically-operable means for indicating the instantaneous magnitude and sense of the restoring force.

14. In a force measuring system, a movable member adapted to be actuated by a force to be measured, means for producing an electrical wave of certain frequency, a pair of transformers cooperatively associated with said member and connected to said wave-producing means and having their secondary windings connected in series opposition with each other, whereby voltages are induced in said secondary windings and normally cancel one another, means on said member for differentially varying the inductive couplings of said transformers in response to movement of said member, whereby to produce across said secondary windings a resultant voltage which is amplitude and phase modulated according to the instantaneous magnitude and sense of movement of said member by a force applied thereto, means responsive to said resultant voltage for producing a voltage whose instantaneous amplitude and polarity are dependent on the magnitude and sense of movement of said member, means responsive to the latter voltage for applying a restoring force to said member, and electrically-operable means for indicating the instantaneous magnitude and sense of the restoring force.

15. A force measuring system according to claim 14, wherein the means for differentially varying the couplings of said transformers comprises a pair of metal vanes on said member.

ROBERT E. PAYNE.

REFERENCES CITED

The following references are of record in the file of this patent:

UNITED STATES PATENTS

| Number | Name | Date |
|---|---|---|
| 1,921,983 | Wittkuhns | Aug. 8, 1933 |
| 2,040,639 | Becker | May 12, 1936 |
| 2,360,751 | Ziebolz | Oct. 17, 1944 |
| 2,371,040 | Fisher et al. | Mar. 6, 1945 |